United States Patent
Bruns

(10) Patent No.: US 6,705,620 B2
(45) Date of Patent: Mar. 16, 2004

(54) COMBINED SNOWMOBILE SKI AND HANDLE

(76) Inventor: Steven A. Bruns, 46988—730th Ave., Hector, MN (US) 55342

( * ) Notice: Subject to any disclaimer, the term of this patent is extended or adjusted under 35 U.S.C. 154(b) by 0 days.

(21) Appl. No.: 10/331,870

(22) Filed: Dec. 30, 2002

(65) Prior Publication Data

US 2003/0160405 A1 Aug. 28, 2003

Related U.S. Application Data

(63) Continuation-in-part of application No. 29/156,098, filed on Feb. 25, 2002, now Pat. No. Des. 467,840.

(51) Int. Cl.[7] .............................................. B62B 17/02
(52) U.S. Cl. ...................................................... 280/28
(58) Field of Search ............................. 280/7.14, 8, 10, 280/24, 25, 26, 22, 28; 180/182, 186, 190

(56) References Cited

U.S. PATENT DOCUMENTS 3,786,886 A * 1/1974 Bombardier ................. 280/25
3,967,692 A * 7/1976 Hoffman ..................... 180/182
5,145,201 A * 9/1992 Metheny ..................... 280/28
5,360,220 A * 11/1994 Simmons ..................... 280/28
5,836,594 A * 11/1998 Simmons ..................... 280/28
6,086,101 A * 7/2000 Cormican ................... 180/182
6,276,699 B1 * 8/2001 Simmons et al. ............. 280/28
6,331,008 B2 * 12/2001 Cormican ..................... 280/22
6,520,512 B1 * 2/2003 Lachance ..................... 280/28
6,527,282 B2 * 3/2003 Ouellette .................... 280/7.14

FOREIGN PATENT DOCUMENTS

CA 2231822 * 6/1998 ........... B62B/17/02

* cited by examiner

Primary Examiner—Frank Vanaman

(57) ABSTRACT

A combined flexible snowmobile ski and handle having a forward section anchored to the front of the ski and connected to longitudinal flanges of the ski with a lost motion cross head. The cross head has a longitudinal transverse slot accommodating a transverse cylindrical member amounted on the flanges of the ski. The handle retains the forward section of the ski in an upwardly curved shape.

18 Claims, 8 Drawing Sheets

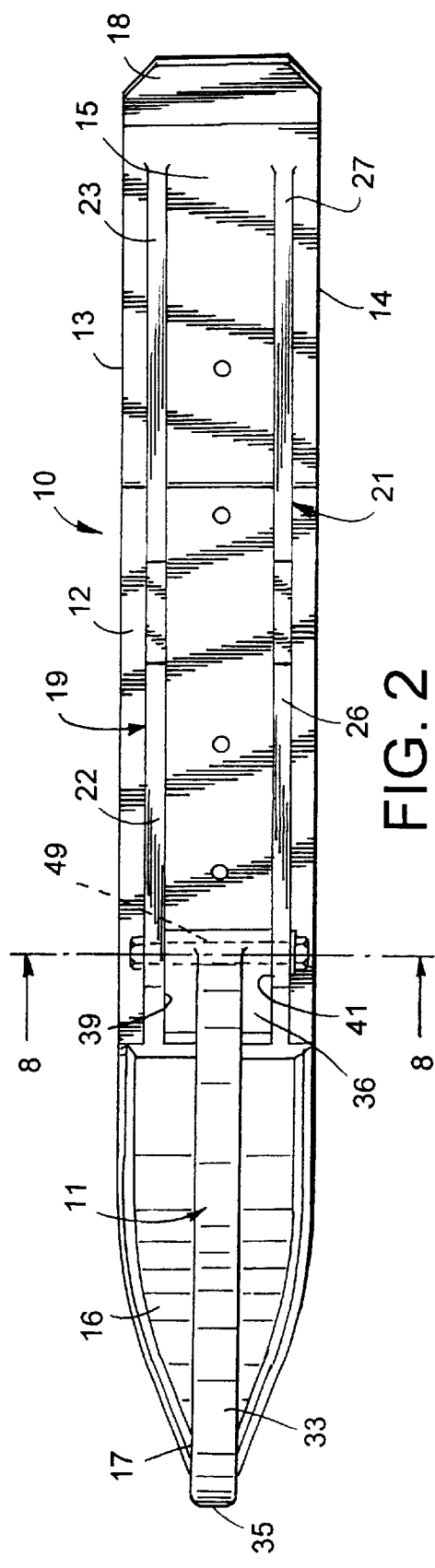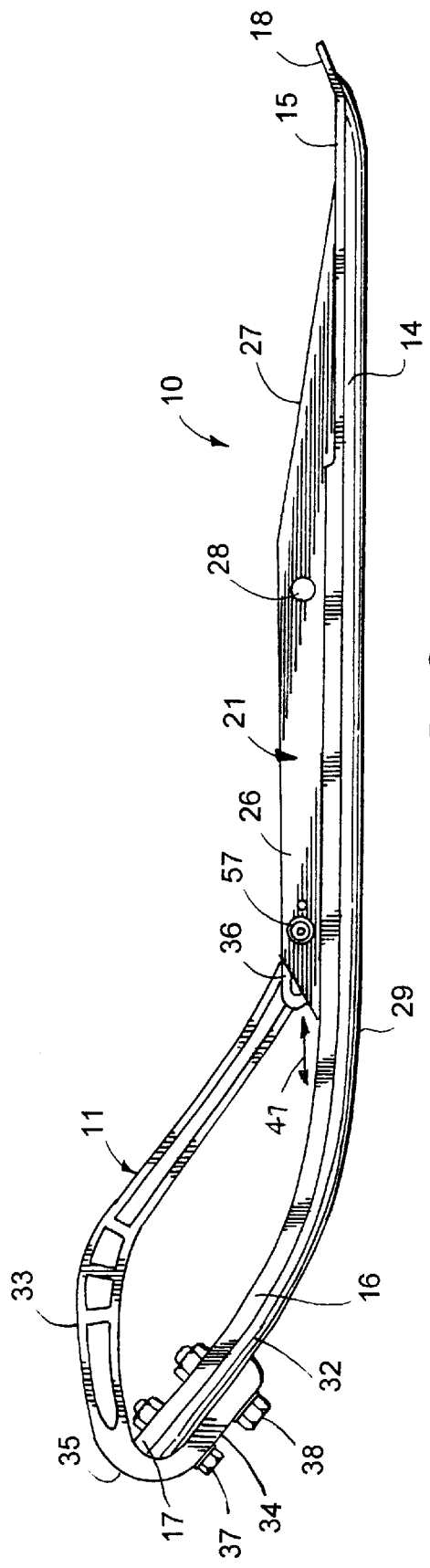

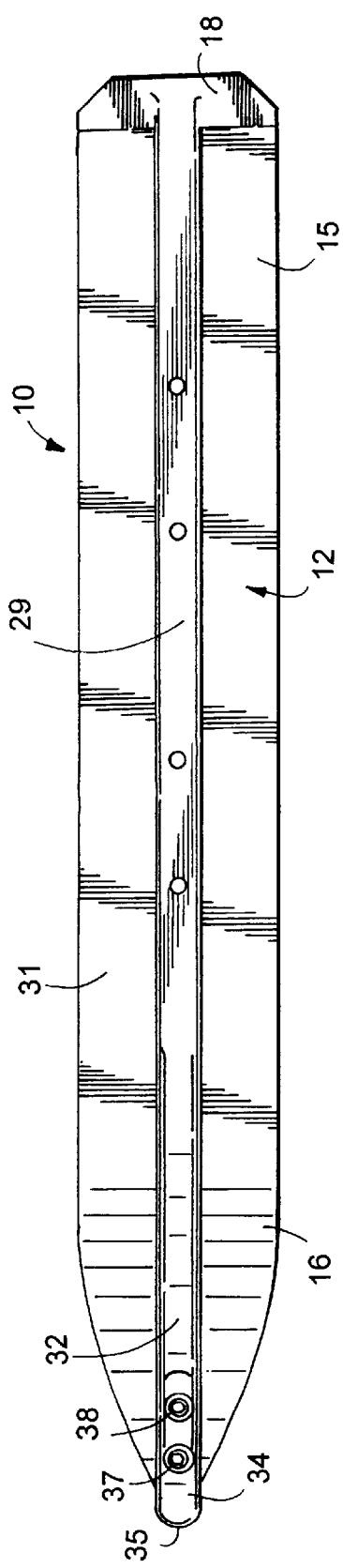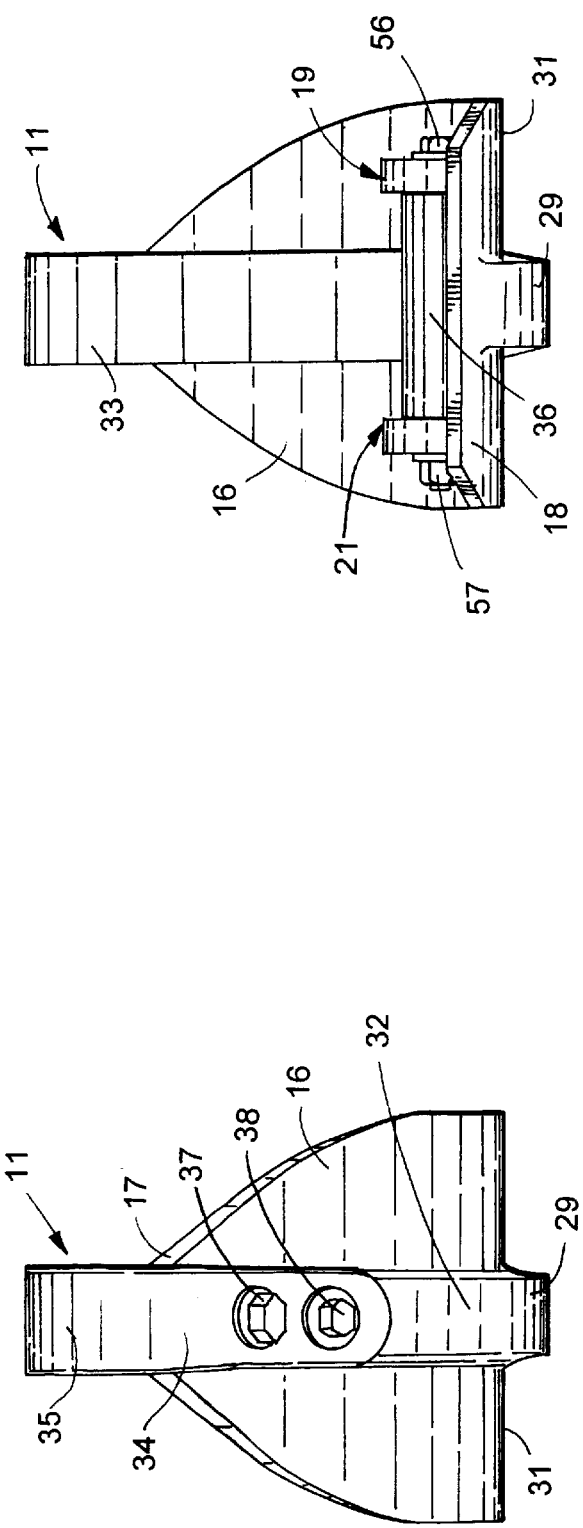
FIG. 4
FIG. 6
FIG. 5

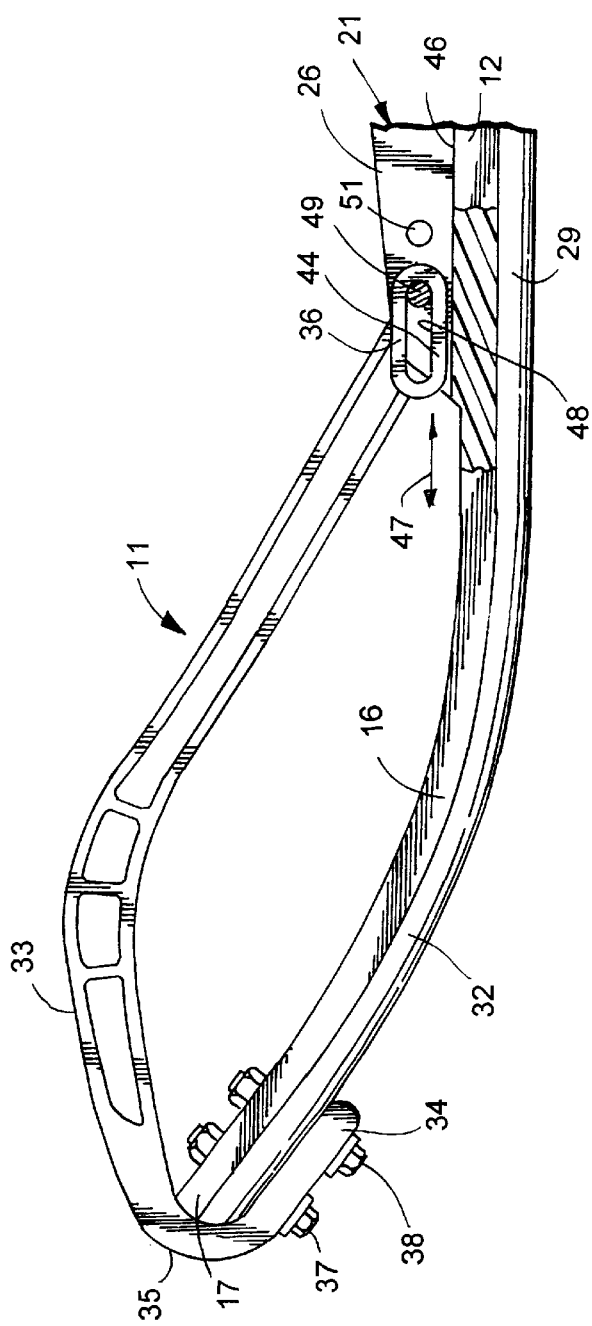
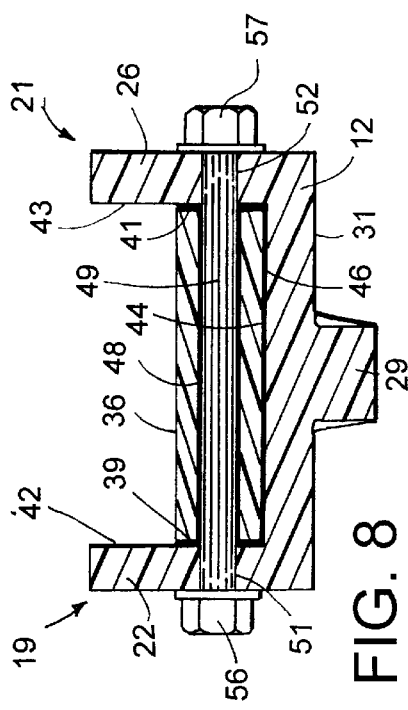
FIG. 7
FIG. 8

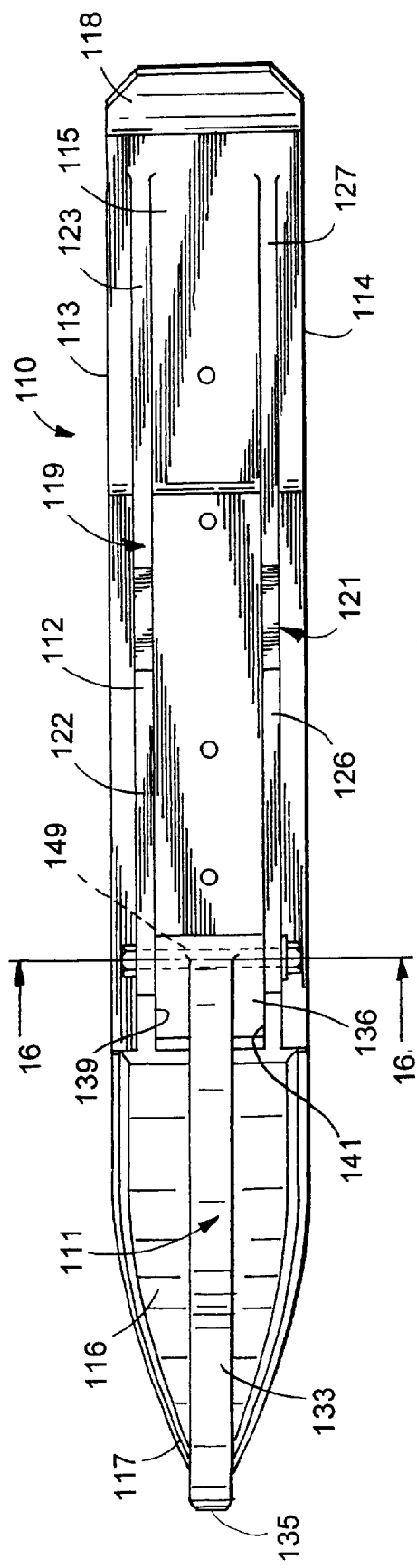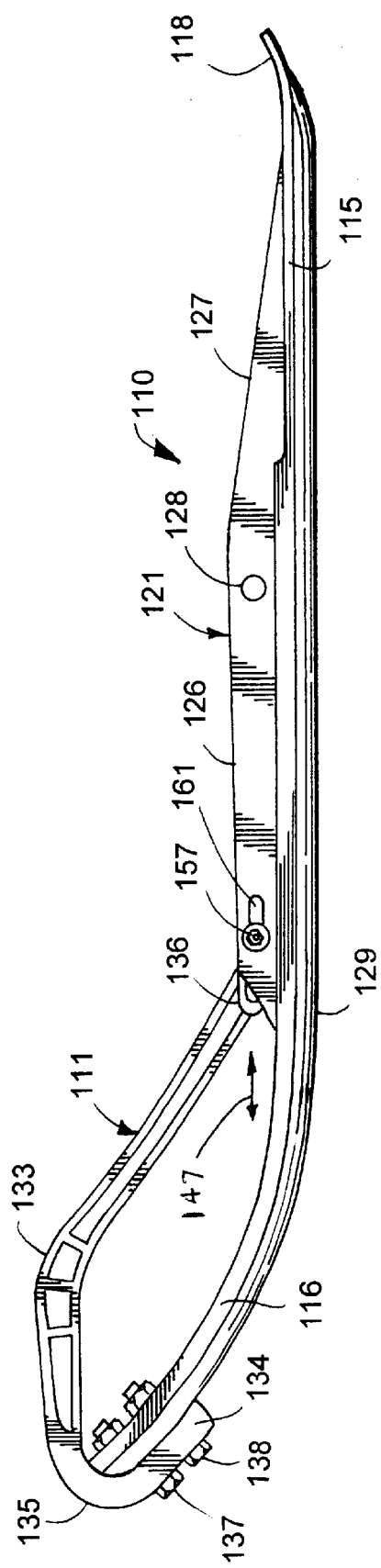

COMBINED SNOWMOBILE SKI AND HANDLE

This application is a continuation-in-part of U.S. patent application Ser. No. 29/156,098 filed Feb. 25, 2002, now U.S. Pat. No. D467,840S.

FIELD OF THE INVENTION

The invention is in the art of skis and runners for snowmobiles and sleds. The skis are flexible plastic skis provided with handles for maintaining the fronts of the skis in upwardly curved configurations.

BACKGROUND OF THE INVENTION

Conventional snowmobile skis are constructed of metal. Plastic liners have been secured to metal skis to reduce collection of snow and ice on the skis and prevent wear of the metal. Rigid loops or handles secured to the front ends of the skis extend upwardly and curved rearwardly to connection structures on the skis. The loops maintain the upward curvatures of the skis and are used as handles for moving the snowmobiles. Rigid loops absorb and transfer impact forces subjected to the curved front of the skis when the skis encounter bumps, moguls, trail ruts, and terrain obstacles, such as rocks and logs. Rigid loops of metal or plastic often sustain bending and structural damage including breaking when subjected to repeated and high impact forces. The damaged and broken loops must be replaced for continued use of the snowmobiles. Examples of U.S. patents related to snowmobile skis and loops are as follows.

W. T. Antcliff in U.S. Pat. No. 3,123,373 discloses a flexible ski sled having a flexible metal runner with an adjustable curved front section for varying the surface tension and contact area between the runner and the snow. The front section of the runner is maintained in a bowed or curved shape with a flexible cord or cable anchored to a post attached to the runner and connected to the tip of the runner. The cord or cable allows the front section of the runner to flex rearwardly to compensate for impact forces applied to the runner. The sled rider can also flex the runner in lateral and vertical directions for steering the sled.

J. W. Fitzpatrick in U.S. Pat. No. 4,595,211 discloses a snowmobile ski having a flat longitudinal member with an upwardly curved forward end. A steering bar or keel having right angle side edges is joined to the bottom member. A plastic flexible strip secured to the bottom of the member inhibits the build up of frozen snow and ice. The plastic strip is a flat flexible plastic body that is bent upwardly and rearwardly about the curved forward end of the ski. A strap attached to the front end of the strip and an anchor on the ski retains the curved position of the front end of the plastic strip.

K. W. Metheny in U.S. Pat. No. 5,145,201 discloses an ultra high molecular weight plastic snowmobile ski having an adjustable curved front section. A variable length turnbuckle pivotally connected to the front tip of the ski and lugs joined to the top of the ski adjusts and holds the front section of the ski in a concave curved configuration.

V. M. Simmons in U.S. Pat. No. 5,360,220 discloses a flexible and resilient plastic snowmobile ski that deforms to absorb impact forces. The ski has a loop attached to the bottom of the front of the ski. The loop curves upwardly and rearwardly to an attachment on the top of the ski rearwardly of the front of the ski to limit movement of the loop and flexing of the front curved portion of the ski. The attachment in one example of the ski is an upright bolt attached to the top of the ski and extended through a longitudinal slot in the rear portion of the loop.

D. D. Cormican in U.S. Pat. No. 6,086,101 discloses a flexible ultra high molecular weight plastic snowmobile ski having a gas pre-load shock absorber pivotally connected to the front of the ski body and pivotally connected to upright longitudinal flanges joined to the top of the body of the ski. The shock absorber has a gas filled barrel and a shock rod to absorb impact forces imported to the ski.

SUMMARY OF THE INVENTION

The invention is a flexible snowmobile ski and handle mounted on the ski operable to hold the front portion of the ski in a biased upwardly curved position and allow the front portion of the ski to have limited rearward flexing action to compensate for impact forces transmitted to the ski. The ski has a generally flat body joined to its upwardly curved front portion. A pair of laterally spaced upright flanges joined to the body extend longitudinally along the length of the body. The handle has a transverse cross head located between the flanges. The head has a transverse longitudinal slot accommodating a transverse cylindrical member or bolt mounted on the flanges. In one embodiment the bolt extends through transverse aligned holes in the flanges to allow the head and handle limited longitudinal lost motion determined by the longitudinal length of the slot. In an alternate embodiment the bolt extends through longitudinal elongated slots in the flanges to increase the amount of lost motion which is determined by the combined longitudinal lengths of the slot in the head and slots in the flanges. The lost motion connection between the handle and flanges of the ski reduces stress, twisting and bending forces on the handle, flanges and ski. Impact forces applied to the curved front portion of the ski are partly absorbed by the spring or flexing of the curved front portion of the ski. The result is that bending and breakage of the handle and flanges is mitigated.

A preferred embodiment of the combined ski and handle has an elongated one-piece ski of compression molded ultra high molecular weight (UHMW) polyethylene. The ski has a generally flat body, a forwardly tapered front section and a rear section joined to the body. A pair of laterally spaced longitudinal flanges are joined to the tops of the body and rear section of the ski. A longitudinal keel is joined to the middle of the bottom of the ski. The handle has a convex curved body having a forward end turned around the front tip front section of the ski and extended along the front of the keel. A pair of fasteners, such as nut and bolt assemblies, firmly secures and anchors the forward end of the handle body to the ski. The rear end of handle body is joined to a transverse head having a transverse longitudinal slot. The head has opposite ends engageable with inside walls of the flanges and a bottom surface located in surface engagement with a top surface of the body between the flanges. The flanges guide and limit the movement of the head to linear longitudinal movements. The surface engagement of the head with the top of the body inhibits longitudinal twisting of the handle. A cylindrical member, such as a bolt extended through the slot in the head, mounts the head on the flanges. The bolt extends through transverse aligned holes in the flanges to allow the head and handle limited longitudinal lost motion determined by the longitudinal length of the slot. In an alternate embodiment, the cylindrical member extends through longitudinal slots in the flanges aligned with the slot in the head to increase the amount of lost motion which is determined by the combined longitudinal lengths of the slot in the head and slots in the flanges. The head and cylindrical member associated with the slots provides longitudinal sliding lost motion to the handle when impact forces are subjected to the front portion of the ski. Part of these forces are absorbed by the spring or flexing of the curved front portion of the ski. The reduction of force and stress on the handle mitigates bending, twisting, and breaking of the handle and flanges of the ski.

DESCRIPTION OF THE DRAWING

FIG. 2 is a top plan view thereof;

FIG. 3 is a side elevational view of the left side thereof;

FIG. 4 is a bottom plan view thereof;

FIG. 5 is a front elevational view thereof;

FIG. 6 is a rear elevational view thereof;

FIG. 7 is an enlarged side elevational view, partly sectional, of the front portion of the ski and lost motion handle;

FIG. 8 is an enlarged sectional view taken along line 8—8 of FIG. 2;

FIG. 10 is a top plan view of FIG. 9;

FIG. 11 is a side elevational view of the left side of FIG. 9;

DESCRIPTION OF EMBODIMENTS OF THE INVENTION

Figure 1:
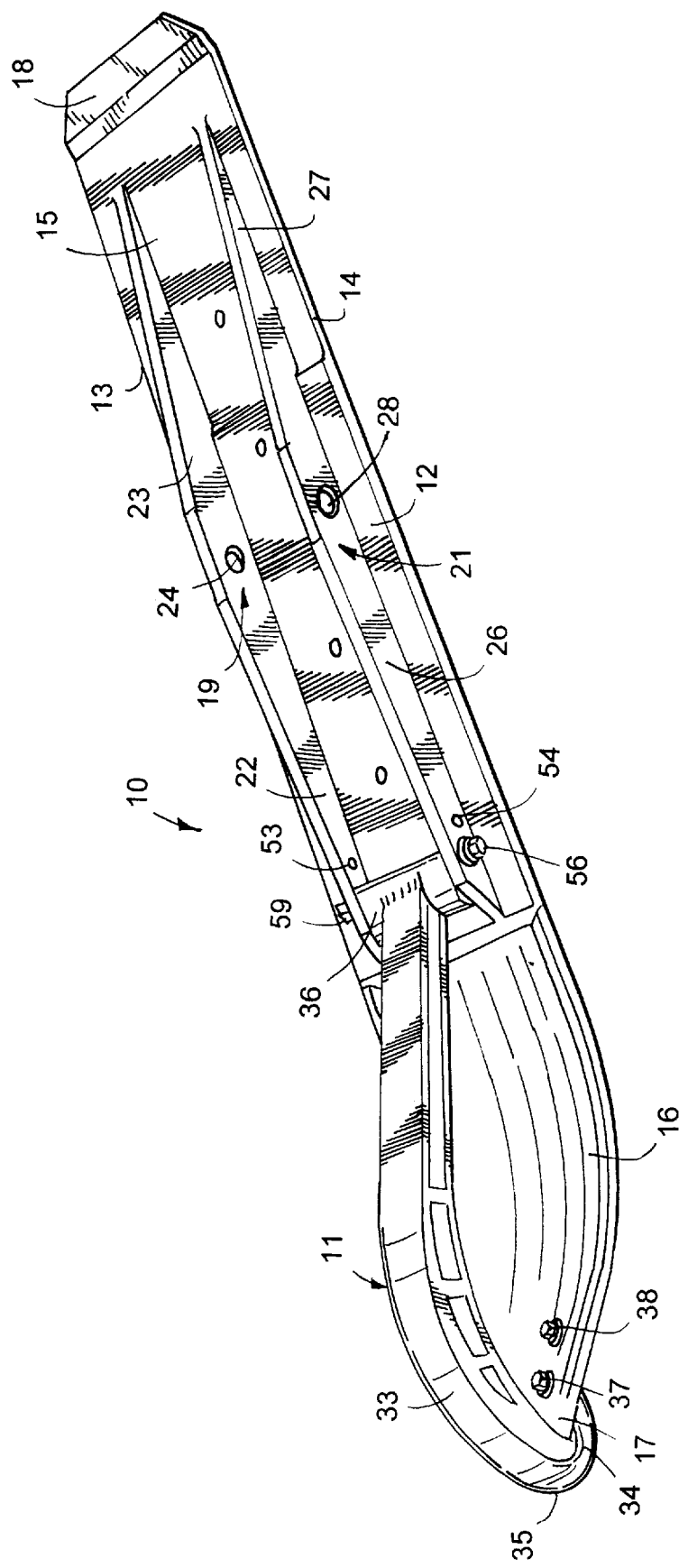
FIG. 1 is a perspective view of a combined snowmobile ski and lost motion handle of the invention.
Figure 9:
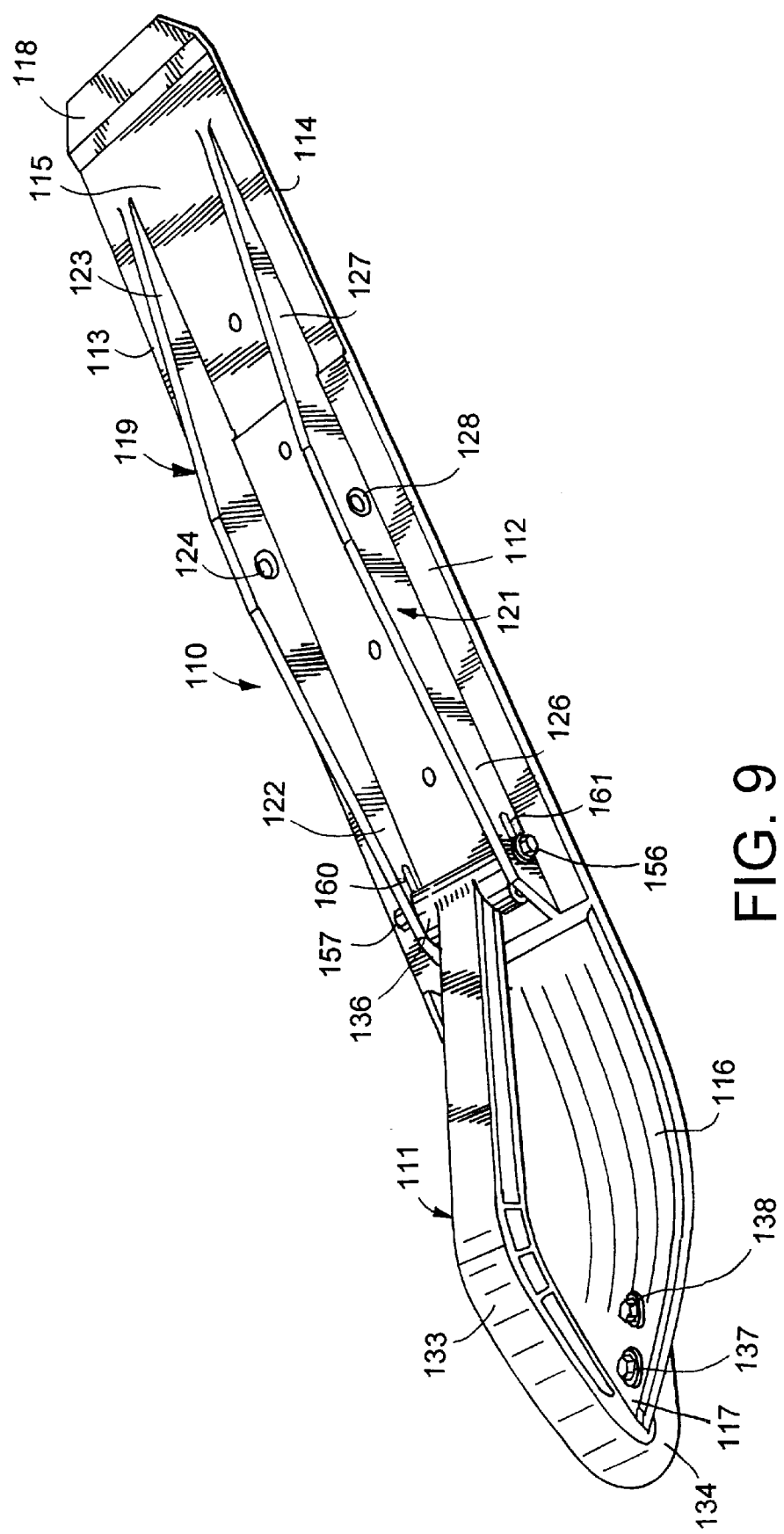
FIG. 9 is a perspective view of a modification of the combined snowmobile ski and lost motion handle of FIG. 1.
Figure 12:
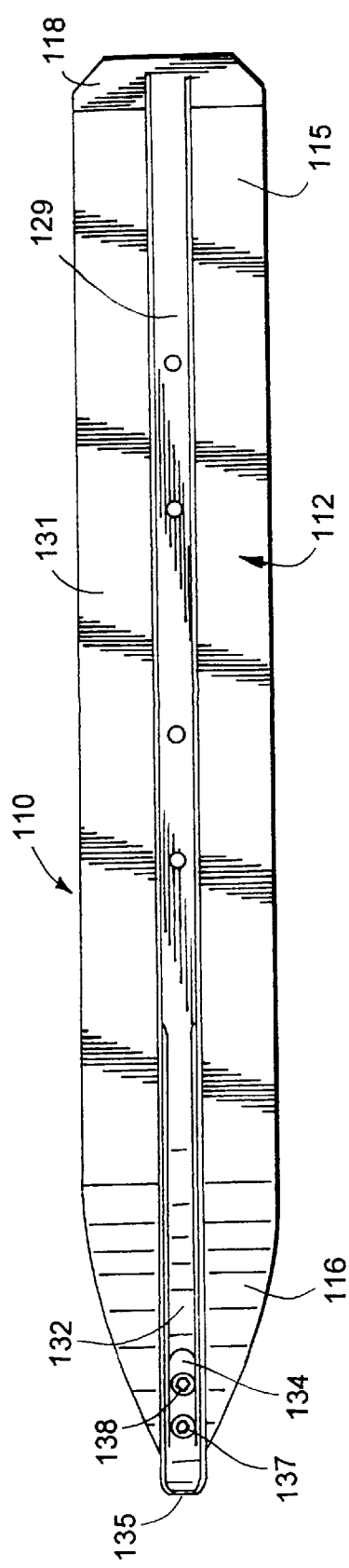
FIG. 12 is a bottom plan view of FIG. 9.
Figure 14:
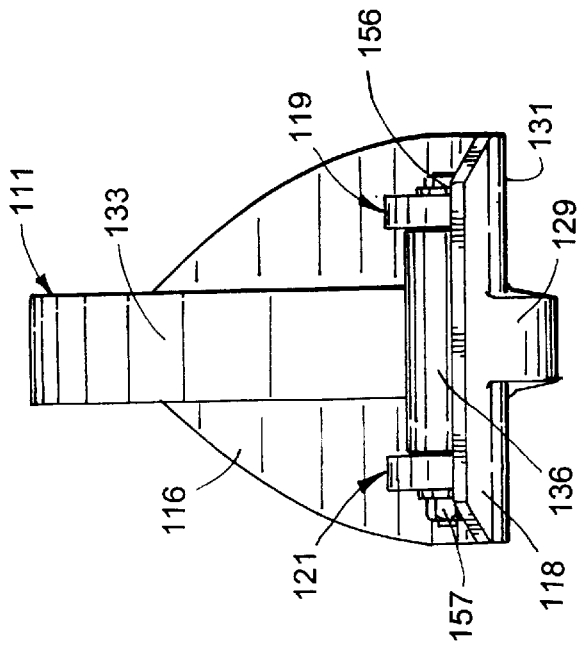
FIG. 14 is a rear elevational view of FIG. 9.
Figure 13:
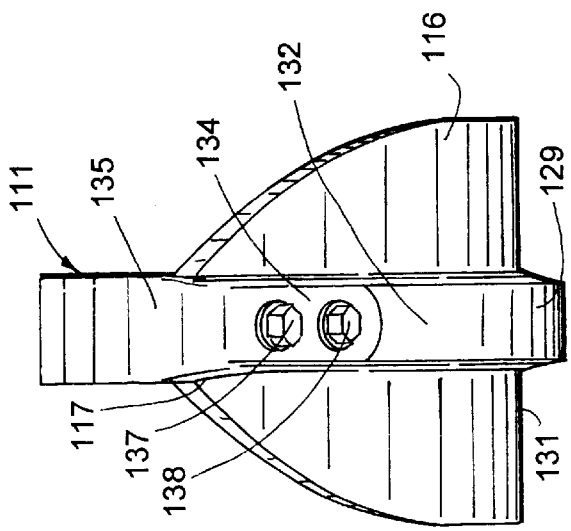
FIG. 13 is a front elevational view of FIG. 9.

A top perspective view of ski 10 and lost motion handle 11 is shown in FIG. 1. Ski 10 has an elongated generally flat body 12 having opposite linear side edges 13 and 14 along the length of the body. An alternative body has side edges linearly converging in a rearward direction to reduce the bottom surface area of the rear portion of the body of the ski. Body 12 may have concave curved side edges. The front section 16 of ski 10 curves upwardly and tapers forwardly to a tip or front end 17. A transverse rear tail or tab 18 projects upwardly and outwardly from a rear section 15 of the ski. Tab 18 has a flat upper surface that deflects snow and air which applies downward forces to the rear of ski 10 to stabilize ski 10 on the snow trail.

As shown in FIGS. 1 and 2, a pair of parallel, laterally spaced, longitudinal flanges 19 and 21 are joined with the top of body 12. Each flange extends longitudinally from the juncture of the curved front section 16 with body 12 to rear section 15 adjacent tab 18. Flange 19 has a front portion 22 inclined inwardly in a forward direction and a rear portion inclined inwardly in a rearward direction. The middle of flange 19 has a transverse bore 24. Flange 21 has the same shape as flange 19. The front portion 26 of flange 21 inclines inwardly in a forward direction and the rear portion 27 inclines inwardly in a rearward direction. The middle of flange 21 has a transverse bore 28 axially aligned with bore 24 in flange 19. Bores 24 and 28 accommodate conventional sleeve bearings or other types of bearings (not shown) that receive pins or bolts that attach a snowmobile steering spindle to flanges 19 and 21. Other types of connections can be used to attach ski 10 to the steering spindle of a snowmobile.

As shown in FIGS. 3 to 6, a continuous longitudinal keel or rib 29 projects downward from the longitudinal center of the bottom 31 of ski 10. Rib 29 has downwardly and inwardly tapered sides and a generally flat bottom wall. The front section 32 of keel 29 curves with front section 16 and extends to tip 17. The rear of keel 29 merges with tab 18 as seen in FIGS. 4 and 6.

Body 12, rear and front sections 15 and 16, tab 18 flanges 19 and 21 and keel 29 is a one-piece structure of flexible wear resistant material. One type of this material is an ultra high molecular weight UHMW linear polyethylene having a molecular weight in the range of 2,000,000 to 6,000,000. UHMW linear polyethylene has light impact strength, high resistance to stress cracking and substantial abrasion resistance. Compression molding of ultra high molecular weight polyethylene methods are used to make the one-piece ski. An example of compression molding of ultra high molecular polyethylene projects is disclosed in U.S. Pat. No. 6,475,084. Other material, such as flexible composites, ceramics, and coated substrates can be used to make the one-piece ski.

Handle 11 is a loop having a convex curved longitudinal body 33 joined to a front member 34 and rear cross head 36. Front member 34 has a reverse hook-shaped nose 35 turned around the tip 17 of the ski and flat portion located in engagement with the forward section of keel 32. Fasteners, shown as a pair of nut and bolt assemblies 37 and 38, secure and anchor front portions 34 of handle 11 to the front upwardly curved front section 16 of ski 10. As seen in FIG. 5, front portion 34 of handle 11 is longitudinally aligned with keel 32. Nut and bolt assemblies 36 and 37 are longitudinally spaced apart to prevent lateral and twisting movements of front of handle relative to the longitudinal axis of the ski. An alternative connection between the front end of a handle and the tip of a ski disclosed in U.S. Pat. No. D 467,840 is incorporated herein by reference.

Cross head 36, shown in FIGS. 2, 6, 7 and 8, positioned between forward flange portions 22 and 26 of flanges 19 and 21 has flat side surfaces or faces 39 and 41 located in sliding contact with inside surfaces 42 and 43 of flange portions 22 and 26. The close surface engagement of cross head faces 39 and 41 with flange portions 22 and 26 prevents lateral and twisting movements of the rear of handle 11 relative to the longitudinal axis of the ski. Head 36 has a flat bottom wall 44 located in sliding contact with the top surface or wall 46 of body 12 located between flanges 19 and 21. The sliding contact between head 36 and top wall 46 of body 12 limits movements of head 36 to linear reciprocating motion as shown by arrow 47 in FIGS. 3 and 7. Head 36 has a transverse longitudinal elongated slot 48 open to side surfaces 39 and 41. A cylindrical member or bolt 49 extends through slot 48 and aligned openings, shown as holes 51 and 52, in flange portions 22 and 26. Side portions 22 and 26 of flanges 19 and 21 have an additional pair of holes 53 and 54, shown in FIG. 1, to allow head 36 to be located rearwardly relative to flanges 19 and 21. Bolt 49 has a head 56 located adjacent the outside of flange portion 22 and a lock nut 57 located adjacent flange portion 23. Nut 57 retains bolt 49 in assembled relation with head 36 and flange portions 22 and 26. As shown in FIGS. 7 and 8, bolt 49 has a diameter equal to the width of slot 48 whereby diametrically opposite portions of bolt 49 are in sliding contact with the inside walls defining slot 48 in cross head 36. Bolt 48 prevents head 36 from moving up and down and retains bottom wall 44 in surface engagement with top wall 46 of body 12. The length of slot 48 is four times the diameter of bolt 49. The length of slot 48 can vary to alter the amount of sliding or lost motion of head 36 relative to bolt 49.

Ski 10 is a compression molded one-piece plastic structure having a generally flat front section 16. Handle 11 is secured to the front of section 16 with bolts 37 and 38 and their associated lock nuts. Front section 16 is forced into a curved shape to allow cross head 36 to be located between flange portions 22 and 26. Bolt 49, as shown in FIG. 8, is then positioned in holes 51 and 52 in flange portions 22 and 26 and slot 48 in cross head 36 to mount cross head 36 on flanges 19 and 21. Front section 16 functions as a leaf spring as it is retained in a stressed state below its elastic limit by handle 11. In use, when front section 16 of ski 10 hits an object, uneven surface, or ice and hard snow front section 16 with flex or spring rearwardly causing cross head 36 to linearly slide on bolt 49 between flange portions 22 and 26. The sliding or lost motion allowed by slot 48 reduces sharp impact forces on the handle 11, flanges 19 and 21 and front section 16 of ski 10. The sliding lost motion of handle 11 on bolt 49 reduces bending, twisting, and breaking of handle 11, flanges 19 and 21, and front section 16 of ski 10.

An alternate embodiment of the combined ski and lost motion handle, shown in FIGS. 9 to 16, has a ski 110 and handle 111. The parts of ski 110 and handle 111 that correspond to the parts of ski 10 and handle 11 have the same reference number with the prefix 1. The description, materials and functions of the identical parts of ski 10 and handle 11 are referenced herein with regard to ski 110 and handle 111.

Figure 15:
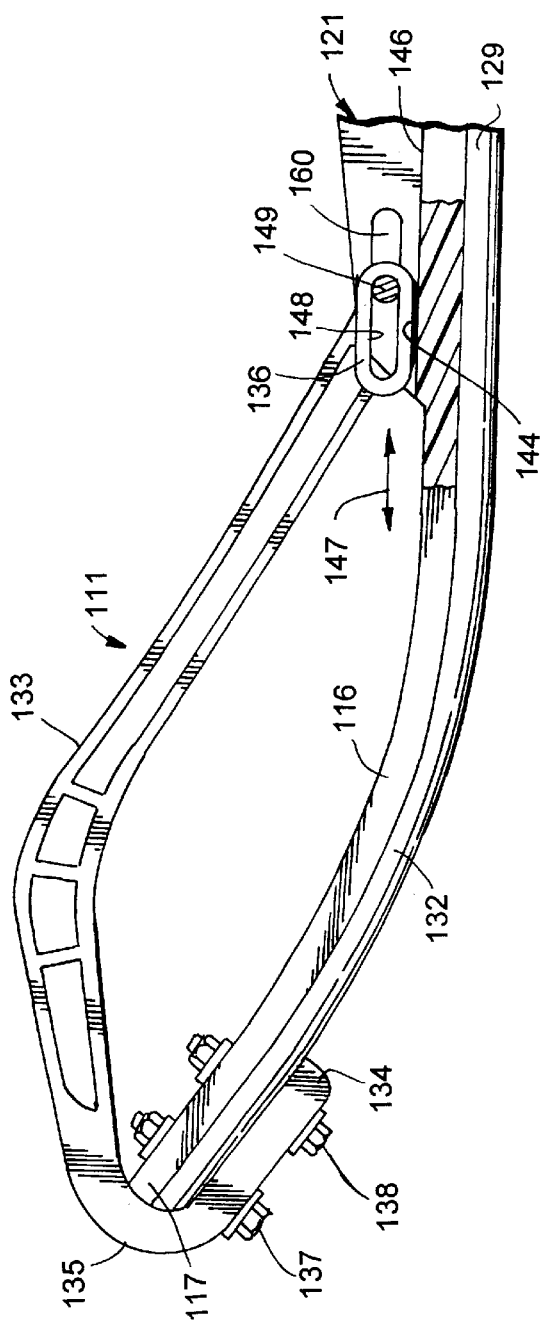
FIG. 15 is an enlarged side elevational view, partly sectional, of the front portion of the ski and lost motion handle of FIG. 9.
Figure 16:
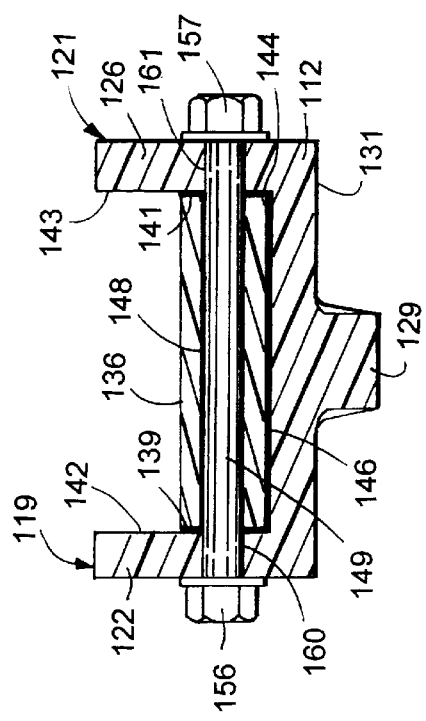
FIG. 16 is an enlarged sectional view taken along line 16—16 of FIG. 10.

As shown in FIGS. 9, 11, 15 and 16, front sections 122 and 126 of flanges 119 and 121 having longitudinal openings, shown as slots 160 and 161 accommodating opposite portions of cylindrical member or bolt 149. Slots 160 and 161 and slot 148 in head 136 are in the same horizontal plane which is parallel to top wall 146 of body 112. Bolt 149 extends through slot 36 and slots 160 and 161 to couple head 136 of handle 111 to flanges 119 and 121. Lock nut 159 on bolt 149 retains bolt 149 in sliding relation with flanges 119 and 121. As seen in FIG. 16, each slot 160 and 161 and a width equal to the diameter of bolt 149 to allow bolt 149 to slide along the length of slots 160 and 161. As shown in FIG. 15, front section 116 of ski 110 biases handle 111 in a forward direction and retaining bolt 149 in the rear of slot 148 and in the fronts of slots 160 and 161. Handle 111 has linear lost motion movement equal to the combined movement of bolt 149 in slots 148 and 160, 161. When front section 116 of ski 110 encounters a mogul or uneven terrain impact forces imported to front section 116 are partly absorbed by the flexing and spring of front section 116 as it moves handle 111 rearwardly. This rearward movement continues until bolt 149 moves the full length of slots 160 and 161 and handle head 136 moves the full length of slot 148. This extension of the lost motion sliding movement of handle 111 reduces stress, twisting and bending forces on handle 111, flanges 119 and 121, and front section 116 of ski 110. The result is that bending and breaking of handle 111, flanges 119 and 121 and other parts of ski 110 is mitigated. The combined ski 110 and handle 111 is a durable, strong, and reliable structure capable of aggressive use.

There has been shown and described herein preferred embodiments of the combined snowmobile ski and handle. Changes and modifications in structures, arrangement of structures and materials can be made by one skilled in the art without departing from the invention.

What is claimed is:

1. A combined ski and handle comprising:
a ski having a body, a flexible front section and a rear section, said body having a top wall, a pair of laterally spaced longitudinal flanges joined to the top wall of the body, said flanges having transversely aligned openings in front portions thereof,
a rigid handle having a longitudinal body with a forward portion and a rear portion, a member joined to the forward portion, a fastener securing the member to the front section of the ski, a cross head joined to the rear portion, said cross head including opposite ends located between and in sliding contact with said flanges to inhibit lateral twisting movements of the handle and front section of the ski and an elongated longitudinal slot extended between said opposite ends transversely of the longitudinal direction of the body, and a transverse cylindrical member extended through said slot and openings in the flanges for mounting the cross head on said flanges and retaining said flexible front section of the ski in an upwardly curved shape, said slot providing said handle with longitudinal lost motion whereby impact forces imparted to said front section of the ski are partly absorbed by flexing the front section of the ski in a rearward direction.

2. The combined ski and handle of claim 1 wherein: said openings in the front portions of the flanges are transversely aligned holes accommodating said cylindrical member.

3. The combined ski and handle of claim 1 wherein: said member includes a first portion extended about the front section of the ski, and a second portion joined to the first portion located in engagement with the front section of the ski, said fastener securing said second portion to the front section of the ski.

4. The combined ski and handle of claim 1 wherein: said cross head has a generally flat bottom wall located in surface engagement with the top wall between said flanges.

5. The combined ski and handle of claim 1 wherein: said cross head has a top wall and bottom wall and a width greater than the width of the body of the handle, said rear portion of the body of the handle being joined to a central portion of the top wall of the cross head and extended upwardly and forwardly from said cross head.

6. The combined ski and handle of claim 1 wherein: said cylindrical member has a diameter substantially equal to the width of said slot in the cross head.

7. A rigid handle for a ski having a flexible front section and upright laterally spaced flanges rearwardly of the front section comprising:
an elongated longitudinal body having a longitudinal axis, a forward portion and a rear portion,
a member joined to the forward portion of the body adapted to be connected to the front section of the ski, and a cross head joined to the rear portion of the body, said cross head extended transversely of the longitudinal axis of the body having opposite ends adapted to be located between and in sliding contact with the laterally spaced flanges and an elongated longitudinal slot extended between and open to said opposite ends, said slot extended transversely of the longitudinal axis of the body.

8. The handle of claim 7 wherein: said member includes a first portion adapted to extend about the front section of the ski and a second portion joined to the first portion adapted to engage and be secured to the front section of the ski.

9. The handle of claim 8 wherein: said second portion has a plurality of holes for accommodating members securing the second portion to the front section of the ski.

10. The handle of claim 7 wherein: said cross head has a generally flat bottom wall.

11. The handle of claim 7 wherein: said cross head has a top and bottom wall and width greater than the rear portion of the body, said rear portion of the body being joined to a central portion of the top wall of the cross head, said bottom wall being generally flat.

12. The handle of claim 7 wherein: said forward portion of the body extends forward and downward from the rear portion of the body, said forward portion having a front end joined to said member.

13. The handle of claim 7 wherein: said rear portion of the body extends upwardly and forwardly from said cross head.

14. A combined ski and handle comprising:
- a ski having a body, a flexible front section and a rear section, said body having a top wall, a pair of laterally spaced longitudinal flanges joined to the top wall of the body, said flanges having transversely aligned elongated longitudinal horizontal first and second slots in front portions thereof located generally parallel to said top wall of the body of the ski,
- a handle having a longitudinal body with a forward portion and a rear portion, a member joined to the forward portion, a fastener securing the member to the front section of the ski, a cross head joined to the rear portion, said cross head including opposite ends located between and in sliding contact with said flanges to inhibit lateral twisting movements of the handle and front section of the ski and an elongated longitudinal third slot extended between said opposite ends transversely of the longitudinal direction of the body, and a transverse cylindrical member extended through said third slot and first and second slots in the flanges for mounting the cross head on said flanges and retaining said flexible front section of the ski in an upwardly curved shape, said third slot providing said handle with longitudinal lost motion movement and said first and second slots providing said handle with additional longitudinal lost motion movement whereby impact forces imparted to said front section of the ski are partly absorbed by flexing the front section of the ski in a rearward direction.

15. The combined ski and handle of claim 14 wherein: said member includes a first portion extended about the front section of the ski, and a second portion joined to the first portion located in engagement with the front section of the ski, said fastener securing said second portion to the front section of the ski.

16. The combined ski and handle of claim 14 wherein: said cross head has a generally flat bottom wall located in surface engagement with the top wall of said body between said flanges.

17. The combined ski and handle of claim 14 wherein: said cylindrical member has a diameter substantially equal to the width of the first and second slots in said flanges.

18. The combined ski and handle of claim 14 wherein: said cylindrical member has a diameter substantially equal to the width of said third slot in the cross head, said diameter being substantially equal to the width of the first and second slots in said flanges.

* * * * *